US006668201B1

(12) United States Patent
Bonissone et al.

(10) Patent No.: US 6,668,201 B1
(45) Date of Patent: Dec. 23, 2003

(54) SYSTEM AND METHOD FOR TUNING A RAW MIX PROPORTIONING CONTROLLER

(75) Inventors: Piero Patrone Bonissone, Schenectady, NY (US); Yu-to Chen, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 343 days.

(21) Appl. No.: 09/594,047

(22) Filed: Jun. 14, 2000

Related U.S. Application Data

(63) Continuation-in-part of application No. 09/189,153, filed on Nov. 9, 1998, now Pat. No. 6,113,256.

(51) Int. Cl.$^7$ .............................................. G05B 13/02

(52) U.S. Cl. ............................................ 700/50; 706/1

(58) Field of Search ........................... 700/50, 28, 44, 700/45, 47, 117; 706/900, 903, 906, 52, 1, 8, 3, 4

(56) References Cited

U.S. PATENT DOCUMENTS

| | | | | |
|---|---|---|---|---|
| 4,910,684 A | | 3/1990 | Ostergaard et al. | 700/274 |
| 5,012,430 A | * | 4/1991 | Sakurai | 700/50 |
| 5,202,954 A | * | 4/1993 | Miyazawa et al. | 706/4 |
| 5,320,425 A | | 6/1994 | Stephenson et al. | 366/1 |
| 5,351,200 A | * | 9/1994 | Impink, Jr. | 702/181 |
| 5,432,885 A | | 7/1995 | Nomoto et al. | 706/52 |
| 5,571,281 A | | 11/1996 | Allen | 366/2 |
| 5,584,926 A | * | 12/1996 | Borgholm et al. | 106/713 |
| 5,995,737 A | | 11/1999 | Bonissone et al. | 703/8 |
| 6,033,102 A | * | 3/2000 | Morihira et al. | 366/8 |
| 6,041,320 A | | 3/2000 | Qin et al. | 706/1 |
| 6,081,796 A | * | 6/2000 | Takagi et al. | 706/1 |
| 6,142,771 A | * | 11/2000 | Doumet | 432/14 |
| 6,330,484 B1 | * | 12/2001 | Qin | 700/50 |

FOREIGN PATENT DOCUMENTS

DE    4204047    2/1992

OTHER PUBLICATIONS

Akalp et al., Supervisory fuzzy control of a rotary cement kiln, IEEE Electrotechnical Conference, 1994, vol. 2, pp. 754–757.*

Tayel et al., A fuzzy logic controller for a dry rotary cement kiln, IEEE Fuzzy Systems, 1997, vol. 3, pp. 1525–1531.*

Naner et al., Real–time expert production guiding and control system based on multimedia computer information processing, IEEE Intelligent Processing Systems, 1997, vol. 1, pp. 787–791.*

C. Karr, "Genetic Algorithms for Fuzzy Controllers", *AI Expert*, pp. 26–33, Feb. 1991.

H. Surmann, et al, "Self–Organizing and Genetic Algorithms for an Automatic Design of Fuzzy Control and Decision Systems", *©ELITE–Foundation*, pp. 1097–1104, Sep. 1993.

P. Bonissone, et al, "Genetic Algorithms for Automated tuning of Fuzzy Controllers: A Transportation Application", *IEEE*, pp. 674–680, 1996.

P. Bonissone, et al, "Industrial Applications of Fuzzy Logic at General Electric", *IEEE*, vol. 83, No. 3, pp. 450–465, Mar. 1995.

(List continued on next page.)

*Primary Examiner*—Leo Picard
*Assistant Examiner*—Zoila Cabrera
(74) *Attorney, Agent, or Firm*—David C. Goldman; Patrick K. Patnode

(57) ABSTRACT

A system and method for tuning a raw mix proportioning controller used in a cement plant. A fuzzy logic supervisory controller tracks the performance of a cement plant simulator to target set points for attaining a correct mix and composition of raw materials. A genetic algorithm adjusts the fuzzy logic supervisory controller's performance by adjusting its parameters in a sequential order of significance.

60 Claims, 12 Drawing Sheets

OTHER PUBLICATIONS

C. Cheng, et al, A., "Fuzzy Speed Control of a Coal Train", *UKACC International Conference on CONTROL '98*, Conference Publication No. 455, pp. 525–530, 1998.

R. Subbu, et al, "Fuzzy Logic Controlled Genetic Algorithms versus Tuned Genetic Algorithms: An Agile Manufacturing Application", *IEEE*, pp. 434–440, 1998.

P. Bonissone, "Fuzzy Logic and Soft Computing: Technology Development and Applications", *General Electric CRD Publication*, pp. 1–68, Mar. 12, 1997.

D. Burkhardt, et al, "Automated Fuzzy Knowledge Base Generation and Tuning", *IEEE*, pp. 179–188, 1992.

O. Cordon, et al, "A Classified Review on the Combination Fuzzy Logic–Genetic Algorithms Bibliography" *Department of Computer Science and Artificial Intelligence, Technical Report #DECSAI 95129*, Oct. 11, 1995, 21 pages.

F. Herrera, et al, "Tuning Fuzzy Logic Controllers by Genetic Algorithms", *International Journal of Approximate Reasoning*, North–Holland, vol. 12, No. 3/4, pp. 299–313, 1995.

C. Karr, et al, "Fuzzy Control of pH Using Genetic Algorithms", *IEEE Trans. On Fuzzy Sys*, vol. 1, No. 1, pp. 46–53, 1993.

J. Kinzel, et al, "Modifications of Genetic Algorithms for Designing and Optimizing Fuzzy Controllers", *IEEE*, pp. 28–33, 1994.

M. Lee, et al, "Integrating Design Stages of Fuzzy Systems Using Genetic Algorithms", *IEEE*, pp. 612–617, 1993.

T. Takagi, et al, "Fuzzy Identification of Systems and Its Applications to Modeling and Control", *IEEE*, pp. 116–132, 1985.

L. Zheng, "A practical Guide to Tune of Proportional and Integral (PI) Like Fuzzy Controllers", IEEE, pp. 633–640, 1992.

C. Karr, "Design of an Adaptive Fuzzy Logic Controller Using a Genetic Algorithm", *US Bureau of Mines, Tuscaloosa Research Center, Proceedings of the Fourth International Conference on Genetic Algorithms*, pp. 450–457.

\* cited by examiner

| e | NM | NS | ZE | PS | PM | Δe |
|---|----|----|----|----|----|----|
|   | ZE | NS | NM | NB | NB | PM |
|   | PS | ZE | NS | NM | NB | PS |
|   | PM | PS | ZE | NS | NM | ZE |
|   | PB | PM | PS | ZE | NS | NS |
|   | PB | PB | PM | PS | ZE | NM |

SYSTEM AND METHOD FOR TUNING A RAW MIX PROPORTIONING CONTROLLER

CROSS-REFERENCE TO RELATED APPLICATIONS

This application is a continuation-in-part of U.S. patent application Ser. No. 09/189,153, entitled "System and Method For Providing Raw Mix Proportioning Control In A Cement Plant With A Fuzzy Logic Supervisory Controller", filed Nov. 9, 1998 now U.S. Pat. No. 6,113,256.

BACKGROUND OF THE INVENTION

This invention relates generally to a cement plant and more particularly to tuning a raw mix proportioning controller in a cement plant.

A typical cement plant uses raw material such as limestone, sandstone and sweetener to make cement. Transport belts (e.g. weighfeeders) transport each of the three raw materials to a mixer which mixes the materials together. A raw mill receives the mixed material and grinds and blends it into a powder, known as a "raw mix". The raw mill feeds the raw mix to a kiln where it undergoes a calcination process. In order to produce a quality cement, it is necessary that the raw mix produced by the raw mill have physical properties with certain desirable values. Some of the physical properties which characterize the raw mix are a Lime Saturation Factor (LSF), a Alumina Modulus (ALM) and a Silica Modulus (SIM). These properties are all known functions of the fractions of four metallic oxides (i.e., calcium, iron, aluminum, and silicon) present in each of the raw materials. Typically, the LSF, ALM and SIM values for the raw mix coming out of the raw mill should be close to specified set points.

One way of regulating the LSF, ALM and SIN values for the raw mix coming out of the raw mill to the specified set points is by providing closed-loop control with a proportional controller. Typically, the proportional controller uses the deviation from the set points at the raw mill as an input and generates new targeted set points as an output for the next time step. Essentially, the closed-loop proportional controller is a conventional feedback controller that uses tracking error as an input and generates a control action to compensate for the error. One problem with using the closed-loop proportional controller to regulate the LSF, ALM and SIM values for the raw mix. coming out of the raw mill is that there is too much fluctuation from the targeted set points. Too much fluctuation causes the raw mix to have an improper mix of the raw materials which results in a poorer quality cement. In order to prevent a fluctuation of LSF, ALM and SIM values for the raw mix coming out of the raw mill, there is a need for a system and a method that can ensure that there is a correct mix and composition of raw materials for making the cement.

BRIEF SUMMARY OF THE INVENTION

This invention relates to a system, method and a computer readable medium that stores computer instructions for tuning a raw mix proportioning controller. In this embodiment, there is a plurality of target set points. A cement plant simulator simulates the operation of a cement plant according to a plurality of set points. A fuzzy logic supervisory controller controls the operation of the cement plant simulator in accordance with the plurality of target set points. More specifically, the fuzzy logic supervisory controller tracks error and change in tracking error between the plurality of set points of the cement plant simulator and the plurality of target set points and provides a control action to the cement plant simulator to minimize the tracking error. A tuner, coupled to the cement plant simulator and the fuzzy logic supervisory controller, optimizes the tracking between the cement plant simulator and the plurality of target set points.

DETAILED DESCRIPTION OF THE INVENTION

Figure 1:
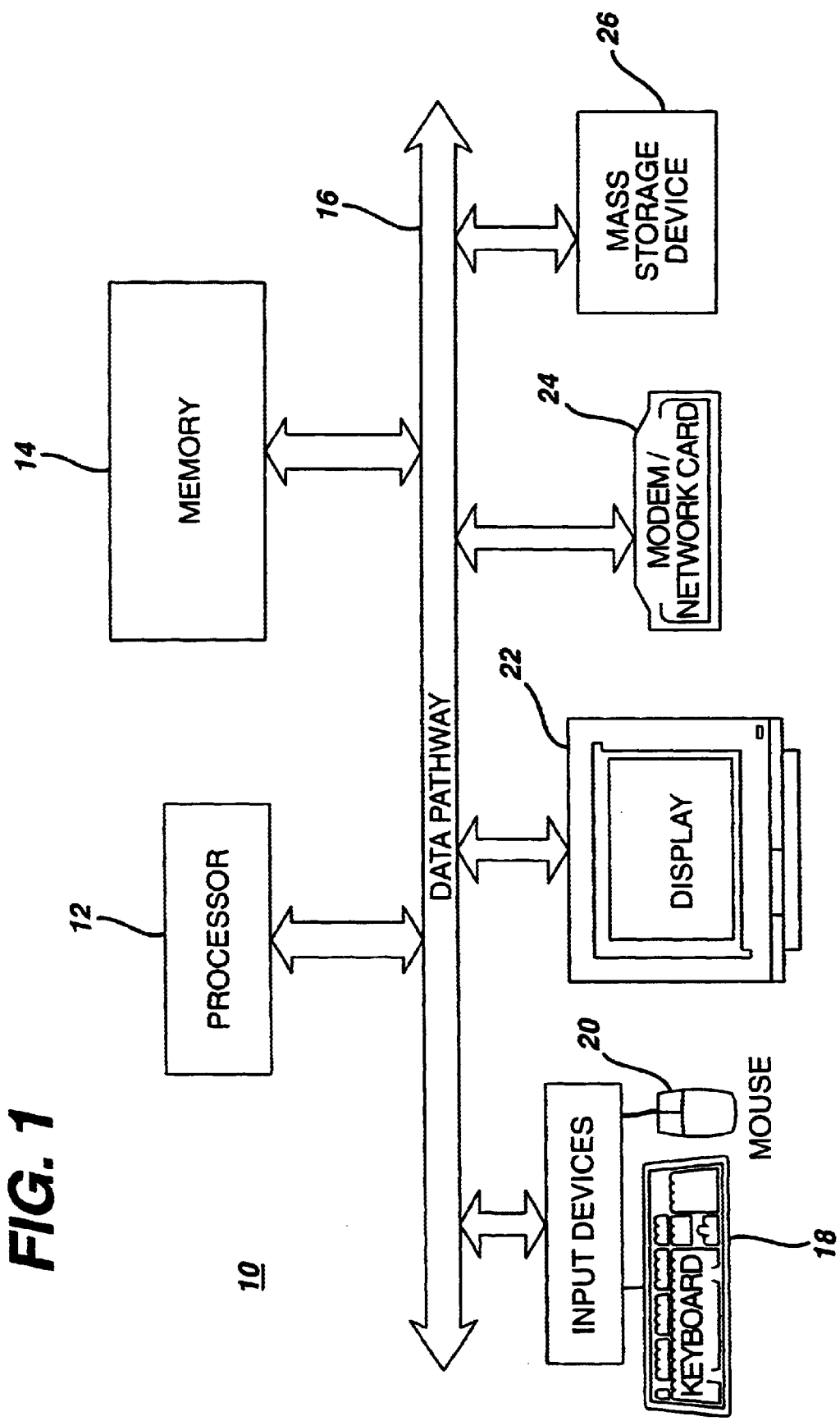
FIG. 1 shows a schematic of a general purpose computer system in which a system for tuning a raw mix proportioning controller operates.

FIG. 1 shows a schematic of a general-purpose computer system 10 in which a system for tuning a raw mix proportioning controller operates. The computer system 10 generally comprises a processor 12, a memory 14, input/output devices, and data pathways (e.g., buses) 16 connecting the processor, memory and input/output devices. The processor 12 accepts instructions and data from the memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices.

The input/output devices comprise a keyboard 18 and a mouse 20 that enter data and instructions into the computer system 10. A display 22 allows a user to see what the computer has accomplished. Other output devices could include a printer, plotter, synthesizer and speakers. A modem or network card 24 enables the computer system 10 to access other computers and resources on a network. A mass storage device 26 allows the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, personal computer, workstation, mini-computer, mainframe computer and supercomputer.

Figure 2:
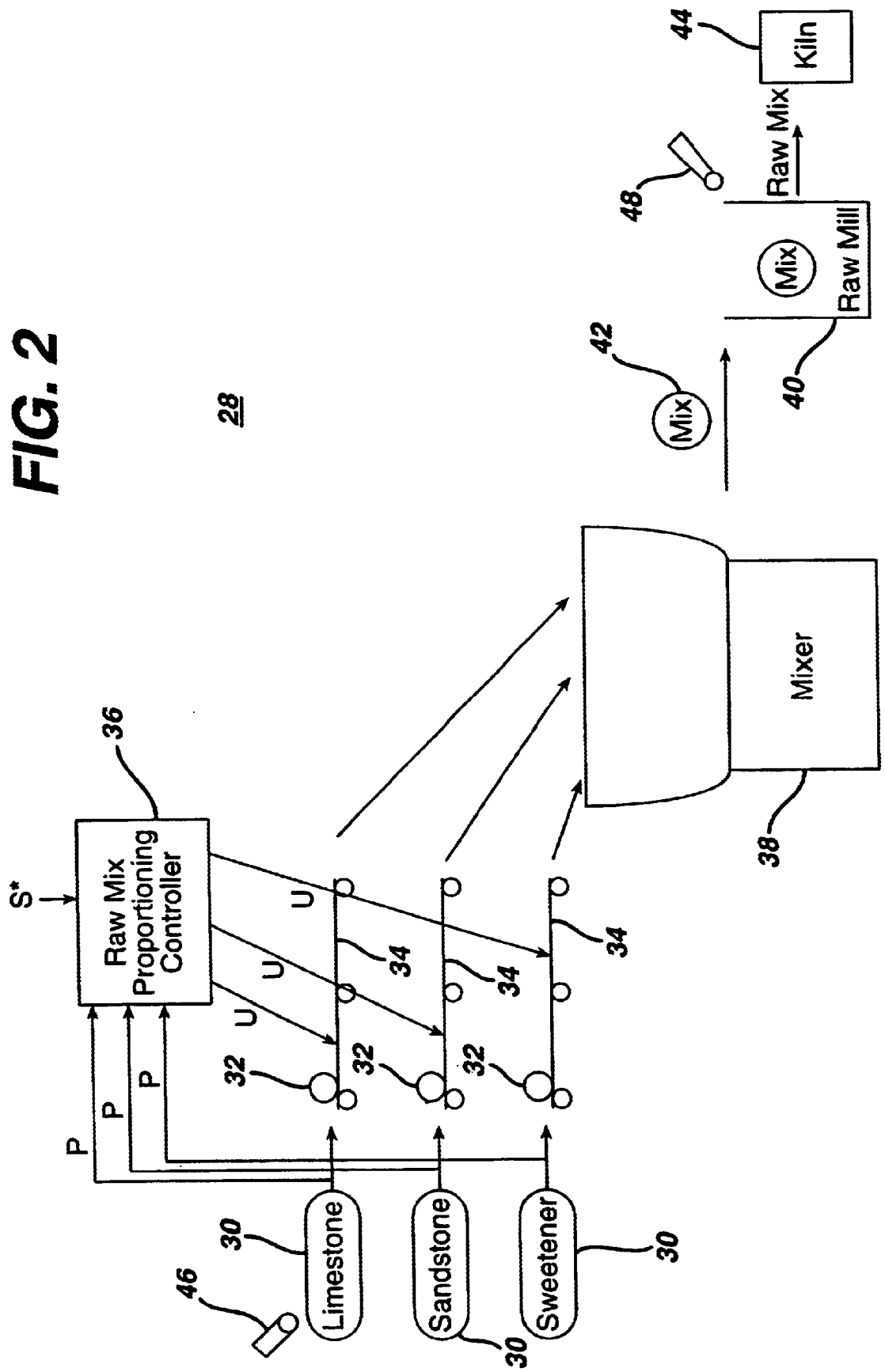
FIG. 2 shows a block diagram of a cement plant that uses a raw mix proportioning controller.

FIG. 2 shows a block diagram of a cement plant 28 that uses a raw mix proportioning controller. The cement plant 28 uses a plurality of raw material 30 such as limestone, sandstone and sweetener to make cement. In addition, moisture can be added to the raw materials. While these materials are representative of a suitable mixture to produce a cement raw mix, it should be clearly understood that the principles of this invention may also be applied to other types of raw material used for manufacturing cement raw mix. Containers 32 of each type of raw material move along a transport belt 34 such as a weighfeeder. A raw mix proportioning controller 36 controls the proportions raw material 30 transported along the transport belts 34. A mixer 38 mixes the proportions of the raw material 30 transported along the transport belts 34. A raw mill 40 receives mixed material 42 from the mixer 38 and grinds and blends it into a raw mix. The raw mill 40 feeds the raw mix to a kiln 44 where it undergoes a calcination process.

As mentioned above, it is desirable that the raw mix produced by the raw mill 40 have physical properties with certain desirable values. In this invention, the physical properties are the LSF, ALM and SIM. These properties are all known functions of the fractions of four metallic oxides (i.e., calcium, iron, aluminum, and silicon) present in each of the raw materials. A sensor 46, such as an IMA QUARCON™ sensor, located at one of the transport belts 34 for conveying the limestone, measures the calcium, iron, aluminum and silicon present in the limestone. Those skilled in the art will recognize that more than one sensor can be used with the other raw materials if desired. Typically, the LSF, ALM and SIN values for the raw mix coming out of the raw mill should be close to specified target set points. Another sensor 48 such as an IMA INACON™ sensor measures the calcium, iron; aluminum and silicon present in the mix 42. Although this invention is described with reference to LSF, ALM and SIM physical properties, those skilled in the art will recognize that other physical properties that characterize the raw mix are within the scope of this invention.

The raw mix proportioning controller 36 continually changes the proportions of the raw material 30 in which the material are mixed prior to entering the raw mill 40 so that the values of LSF, ALM and SIM are close to the desired target set points and fluctuate as little as possible. The raw mix proportioning controller 36 uses fuzzy logic supervisory control to continually change the proportions of the raw material. In particular, the fuzzy logic supervisory control uses targeted set points and the chemical composition of the raw material as inputs and generates control actions to continually change the proportions of the raw material. The mixer 38 mixes the proportions of the raw material as determined by the fuzzy logic supervisory control and the raw mill 40 grinds the mix 42 into a raw mix.

Figure 3:
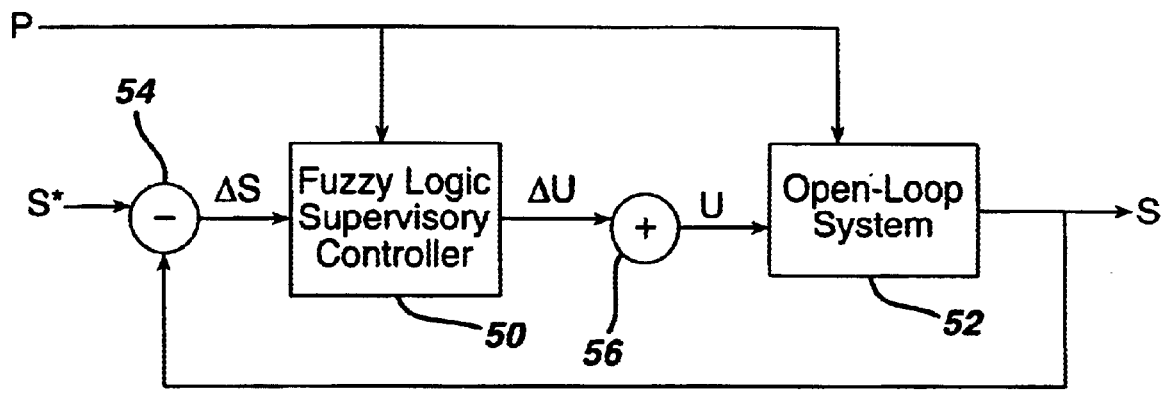
FIG. 3 shows a schematic of the fuzzy logic supervisory control provided by the raw mix proportioning controller shown in FIG. 2.

FIG. 3. shows a schematic of the fuzzy logic supervisory control provided by the raw mix proportioning controller 36. There are two main components to the fuzzy logic supervisory control provided by the raw mix proportioning controller; a fuzzy logic supervisory controller 50 and an open-loop system 52. The fuzzy logic supervisory control takes S* and P as inputs and generates S as an output, where S* is the targeted set points, P is the process composition matrix of the raw materials, and S is the actual set points. A more detailed discussion of these variables is set forth below. At each time step, the fuzzy logic supervisory controller Attempts to eliminate the tracking error, which is defined as;

$$\Delta S(t) = S^* - S(t) \tag{1}$$

by generating $\Delta U(t)$, the change in control action, which results in proper control action for the next time step which is defined as:

$$U(t+1) = \Delta U(t) + U(t) \tag{2}$$

More specifically, the fuzzy logic supervisory controller 50 uses gradient information to produce change in control to compensate the tracking error. In FIG. 3, a subtractor 54 performs the operation of equation 1 and a summer 56 performs the operation of equation 2.

Figure 4:
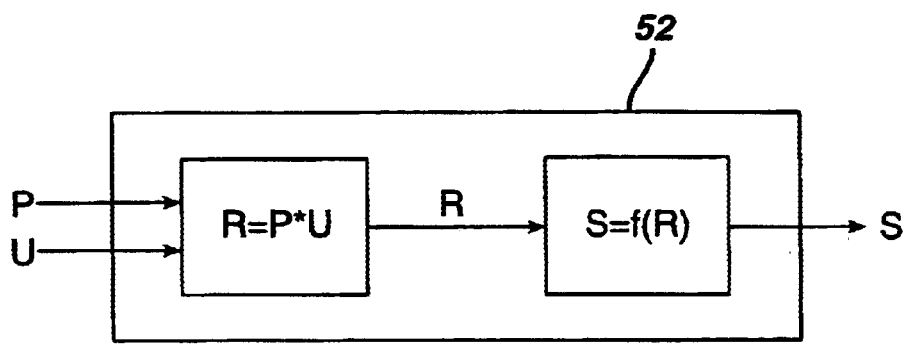
FIG. 4 shows a more detailed schematic of the open-loop system shown in FIG. 3.

FIG. 4 shows a more detailed diagram of the open-loop system 52 shown in FIG. 3. The open-loop system 52 receives P and U as inputs and generates S as an output, where P is a process composition matrix of size 4 by 3, U is a control variable matrix of size 3 by 1, S is the actual set point matrix of size 3 by 1, and R is a weight matrix of size 4 by 1.

The process composition matrix P represents the chemical composition (in percentage) of the input raw material (i.e., limestone, sandstone and sweetener) and is defined as:

$$P = \begin{bmatrix} c_1 & c_2 & c_3 \\ s_1 & s_2 & s_3 \\ a_1 & a_2 & a_3 \\ f_1 & f_2 & f_3 \end{bmatrix} \tag{3}$$

Column 1 in matrix P represents the chemical composition of limestone, while columns 2 and 3 in P represent sandstone and sweetener, respectively. This invention assumes that only column 1 in P varies over time, while columns 2 and 3 are considered constant at any given day. Row 1 in matrix P represents the percentage of the chemical element CaO present in the raw material, while rows 2, 3, and 4 represent the percentage of the chemical elements $SiO_2$, $Al_2O_3$ and $Fe_2O_3$, respectively, present in the raw materials.

The control variable vector U represents the proportions of the raw material (i.e., limestone, sandstone and sweetener) used for raw mix proportioning. The matrix U is defined as:

$$U = \begin{bmatrix} u_1 \\ u_2 \\ u_3 \end{bmatrix} \quad (4)$$

wherein $u_3 = 1 - u_1 - u_2$.

The set point vector S contains the set points LSF, SIM and ALM and is defined as:

$$S = \begin{bmatrix} LSF \\ SIM \\ ALM \end{bmatrix} \quad (5)$$

The weight matrix R is defined as:

$$R = \begin{bmatrix} C \\ S \\ A \\ F \end{bmatrix} \quad (6)$$

wherein C, S, A and F are the weight of $CaO$, $SiO_2$, $Al_2O_3$ and $Fe_2O_3$, respectively, and R is derived by multiplying P by U. A function $f$ takes R as input and generates S as output. The function $f$ comprises three simultaneous non-linear equations defined as follows:

$$LSF = \frac{C}{2.8 \cdot S + 1.18 \cdot A + 0.6 \cdot F} \quad (7)$$

$$SIM = \frac{S}{A + F} \quad (8)$$

$$ALM = \frac{A}{F} \quad (9)$$

wherein:

$$C = c_1 \cdot u_1 + c_2 \cdot u_2 + c_3 \cdot (1 - u_1 - u_2) \quad (10)$$

$$S = s_1 \cdot u_1 + s_2 \cdot u_2 + s_3 \cdot (1 - u_1 - u_2) \quad (11)$$

$$A = a_1 \cdot u_1 + a_2 \cdot u_2 + a_3 \cdot (1 - u_1 - u_2) \quad (12)$$

$$F = f_1 \cdot u_1 + f_2 \cdot u_2 + f_3 \cdot (1 - u_1 - u_2) \quad (13)$$

and $u_1$, $u_2$ and $u_3 = 1 - u_1 - u_2$ are the dry basis ratio of limestone, sandstone and sweetener, respectively. Furthermore, $c_i$, $s_i$, $a_i$ and $f_i$ are the chemical elements of process matrix P defined in equation 3.

Figure 5:
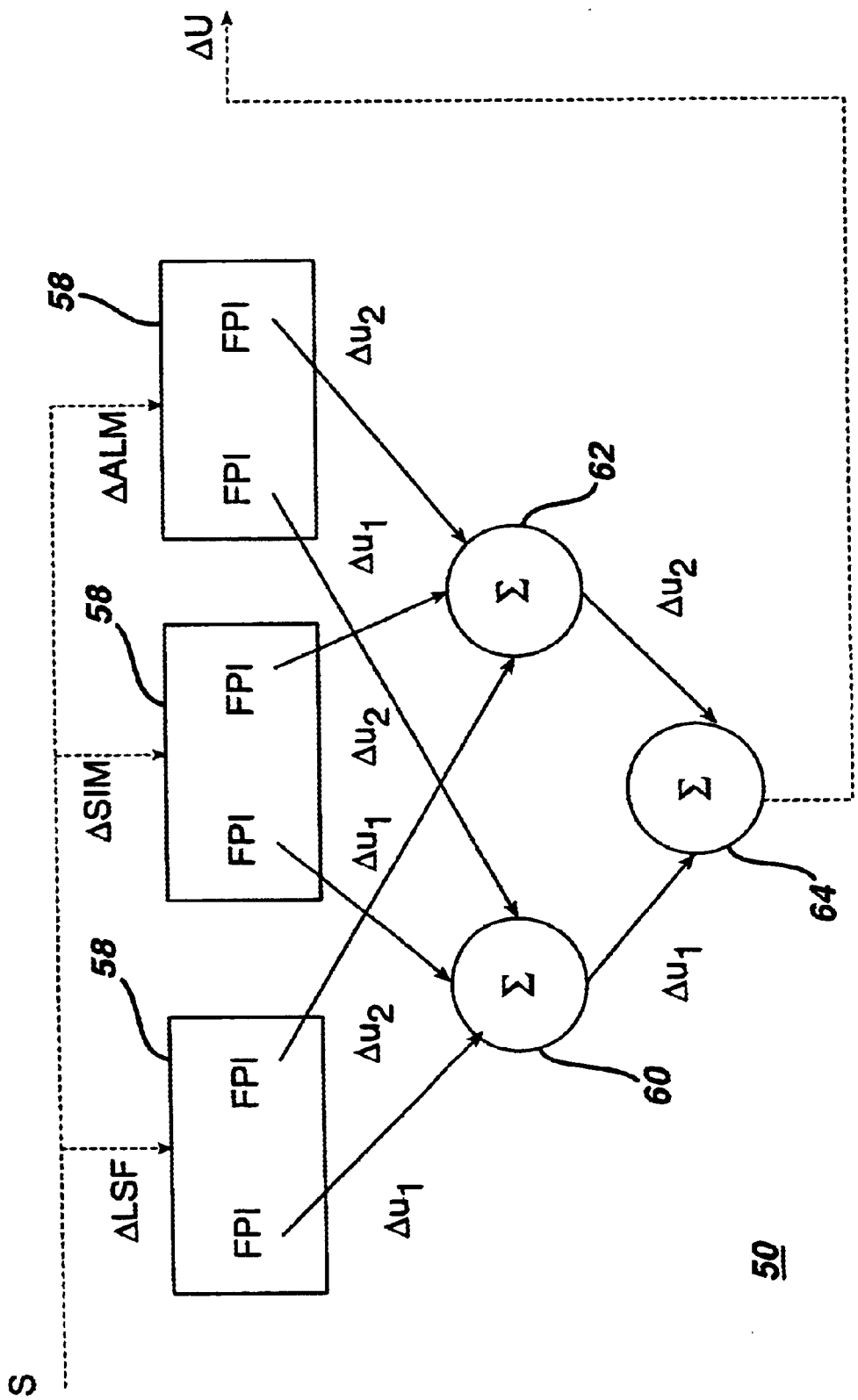
FIG. 5 shows a more detailed view of the fuzzy logic supervisory controller shown in FIG. 3.

FIG. 5 shows a more detailed diagram of the fuzzy logic supervisory controller 50 shown in FIG. 3. The fuzzy logic supervisory controller 50 comprises a plurality of low level controllers 58, wherein each low level controller 58 receives a change in a target set point ΔS as an input and generates a change in a control action ΔU as an output. The plurality of low level controllers are preferably FPI controllers, however, other types of fuzzy logic controllers are within the scope of this invention. In. the preferred embodiment, as shown in FIG. 5, the fuzzy logic supervisory controller 50 comprises at least three pairs of FPI controllers 58, wherein each of the at least three pairs of low level controllers receives a change in a target set point ΔS as an input and generates a change in a control action ΔU as an output. As shown in FIG. 5, one pair of the FPI controllers receives the change in lime saturation factor ΔLSF as the input, a second pair of the FPI controllers receives silica modulus ΔSIM as the input, and a third pair of the FPI controllers receives alumina modulus ΔALM as the input. As mentioned above, each FPI controller in a pair of the FPI controllers generates a change in a control action as an output. More specifically, one FPI controller in a pair generates a change in control action $\Delta u_1$ as one output and the other FPI controller in the pair generates a change in control action $\Delta u_2$ as a second output. The change in control action $\Delta u_1$ is representative of the dry basis ratio of limestone, while the change in control action $\Delta u_2$ is representative of the dry basis ratio of sandstone.

The fuzzy logic supervisory controller 50 also comprises a first summer 60 and a second summer 62, coupled to each pair of the FPI controllers 58, for summing the change in control actions generated therefrom. In particular, the first summer 60 receives the change in control actions $\Delta u_1$ generated from each pair of the FPI controllers, while the second summer 62 receives the change in control actions $\Delta u_2$ generated from each of the pairs. The first summer 60 sums all of the control actions $\Delta u_1$ together, while the second summer 62 sums all of the control actions $\Delta u_2$ together. A third summer 64, coupled to the first summer 60 and second summer 62 sums together the change in control actions for both $\Delta u_1$ and $\Delta u_2$ and generates the change in control action ΔU therefrom. Essentially, the high level fuzzy logic supervisory controller 50 aggregates the three pairs of low-level FPI controllers to come up with a unified control action. Furthermore, it may provide a weighting function to the above-described aggregation process to determine the trade-off of the overall control objective. For instance, to concentrate on eliminating ΔLSF, more weight would be put on the control action recommended by the first pair of FPI controllers.

Figure 6:
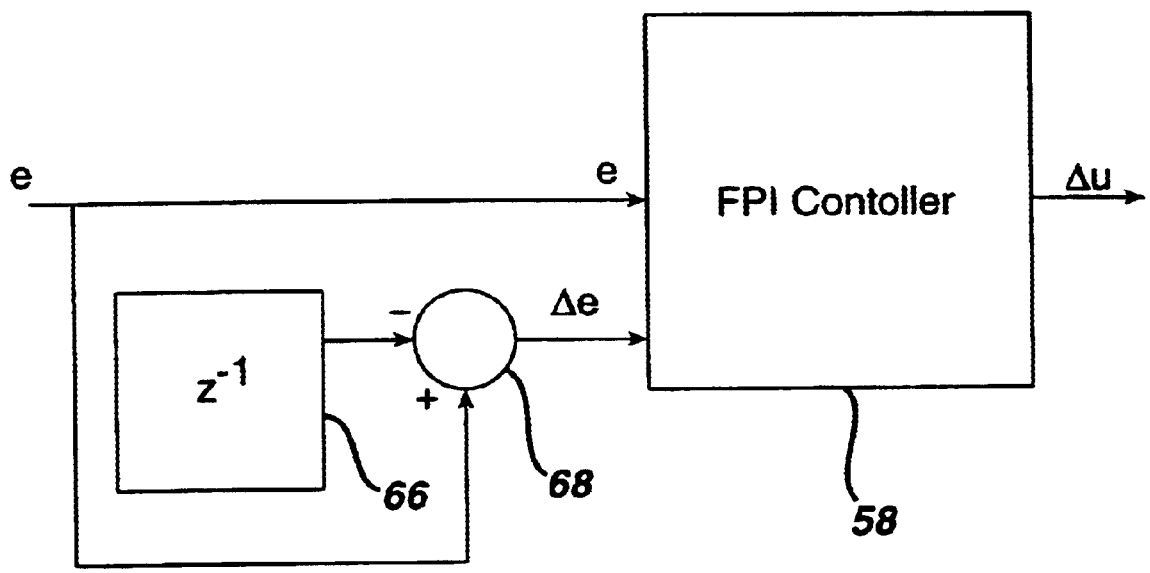
FIG. 6 shows a block diagram of a more detailed view of one of the fuzzy logic proportional integral (FPI) controllers used in the fuzzy logic supervisory controller.

FIG. 6 shows a block diagram of a more detailed view of one of the FPI controllers 58 used in the fuzzy logic supervisory controller 50. The FPI controller 58 receives error e and change in error Δe as inputs and generates an incremental control action Δu as an output. The error e corresponds to the input ΔS which is ΔLSF, ΔSIM and ΔALM. Thus, an input for one pair of FPI controllers is defined as:

$$e = \Delta LSF = LSF^* - LSF \quad (14)$$

while the input for a second pair of FPI controllers is defined as:

$$e = \Delta SIM = SIM^* - SIM \quad (15)$$

while the input for the third pair of FPI controllers is defined as:

$$e = \Delta ALM = ALM^* - ALM \quad (16)$$

The change in error Δe is defined as:

$$\Delta e = e(t) - e(t-1) \quad (17)$$

wherein e(t) is the error value at time step t, while e(t−1) represent the error value at t−1 time step. Thus, there would be a change in error Δe at each pair of the FPI controllers in the fuzzy logic supervisory controller. As shown in FIG. 6, the change in error Δe for a FPI controller is determined by a delay element (i.e., a sample and hold) 66 and a summer 68.

Figure 7:
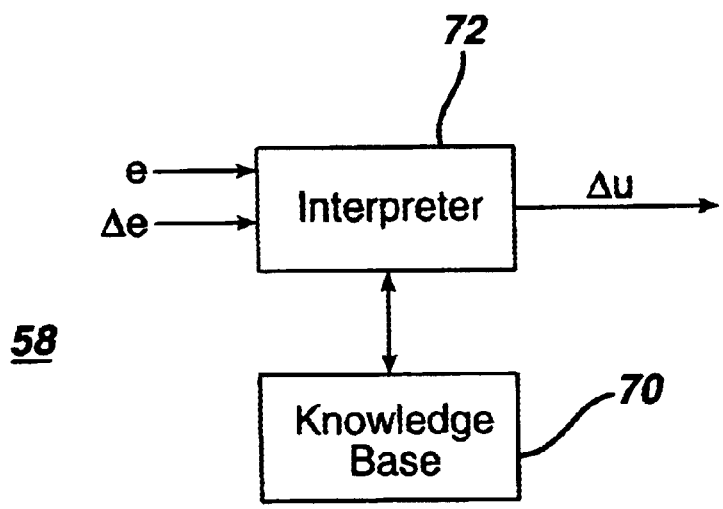
FIG. 7 shows a block diagram of a more detailed view of the FPI controller shown in FIG. 6.

FIG. 7 shows a block diagram of a more detailed view of the FPI controller shown in FIG. 6. The FPI controller 58 as shown in FIG. 7 comprises a knowledge base 70 having a rule set, term sets, and scaling factors. The rule set maps linguistic descriptions of state vectors such as e and Δe into the incremental control actions Δu; the term sets define the semantics of the linguistic values used in the rule sets; and the scaling factors determine the extremes of the numerical range of values for both the input (i.e., e and Δe) and the output (i.e., Δu) variables. An interpreter 72 is used to relate the error e and the change in error Δe to the control action Δu according to the scaling factors, term sets,.and rule sets in the knowledge base 70.

Figure 8A:
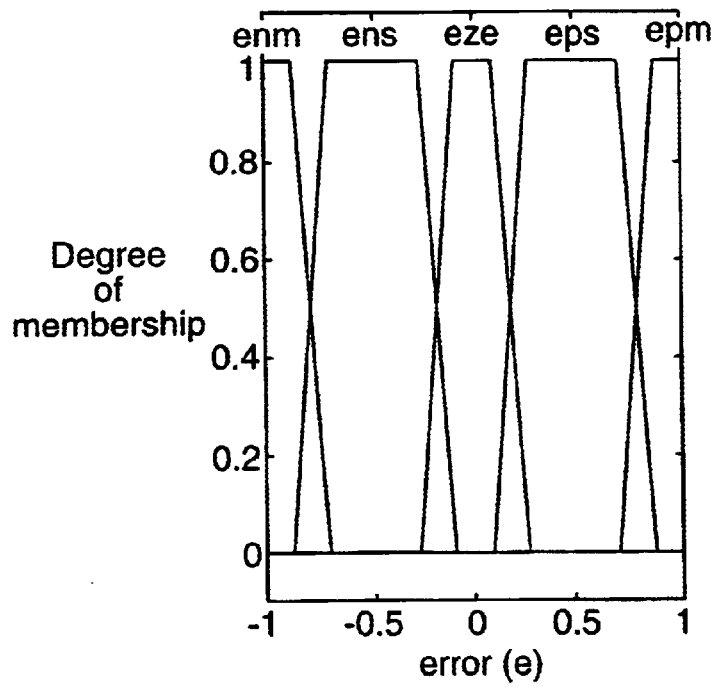
FIGS. 8a–8c show examples of fuzzy membership functions used by the FPI controllers.
Figure 8B:
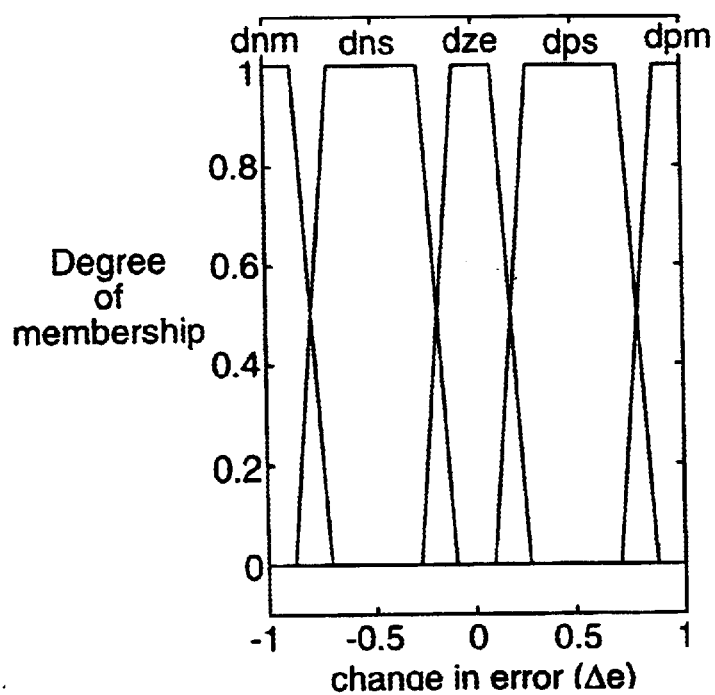
Figure 8C:
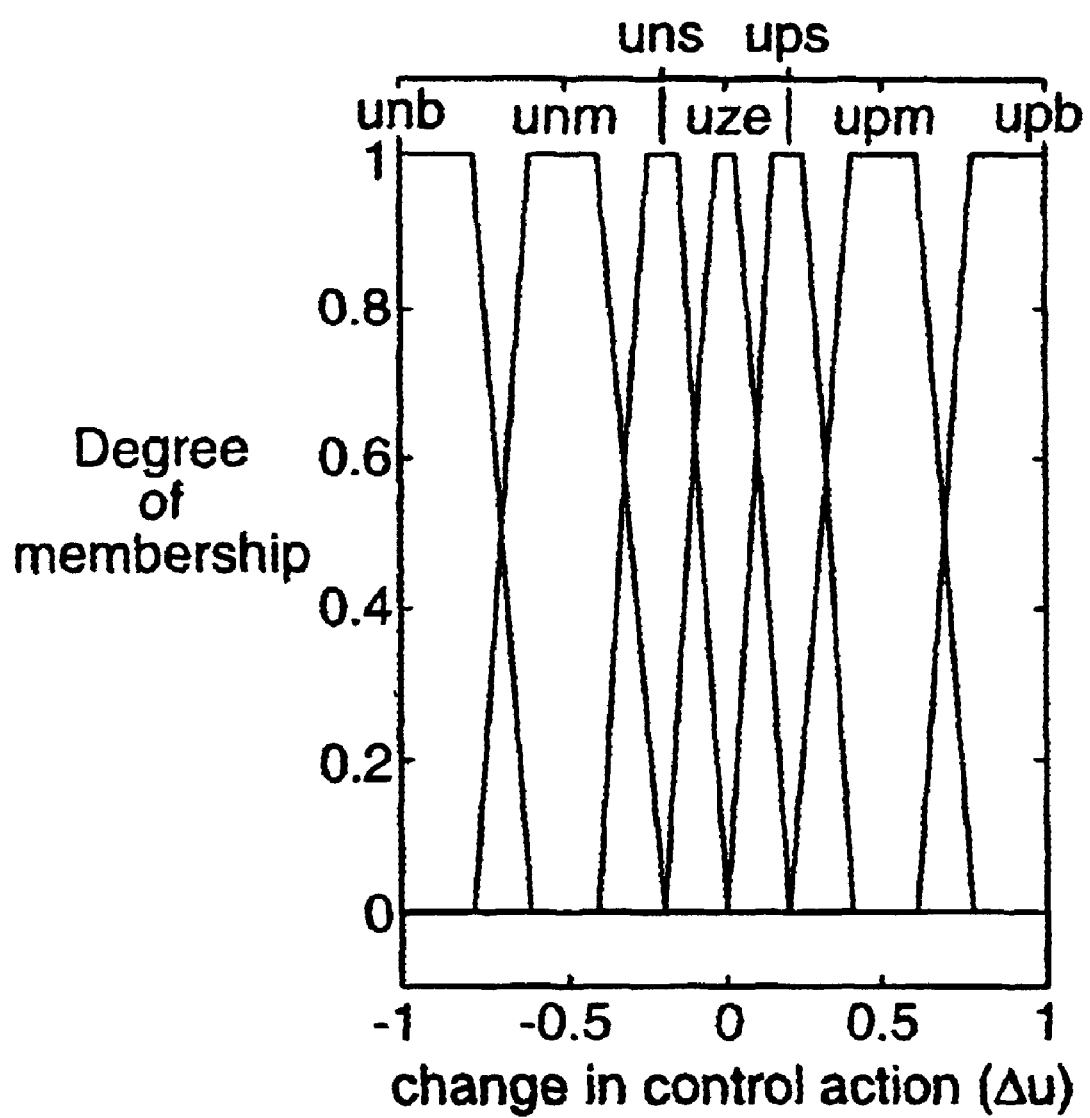

In this invention, each of the input variables (e and Δe) and the output variable (Δu) have a term set. The term sets are separated into sets of NB, NM, NS, ZE, PS, PM and PB, wherein N is negative, B is big, M is medium, S is small, P is positive, and ZE is zero. Accordingly, NB is negative big, NM is negative medium, NS is negative small, PS is positive small, PM is positive medium and PB is positive big. Those skilled in the art will realize that there are other term sets that can be implemented with this invention. Each term set has a corresponding membership function that returns the degree of membership or belief, for a given value of the variable. Membership functions may be of any form, as long as the value that is returned is in the range of [0,1]. FIGS. 8a–8c show examples of fuzzy membership functions used for the error e, the change in error Δe and the change in control action Δu, respectively.

Figures 9, 10:
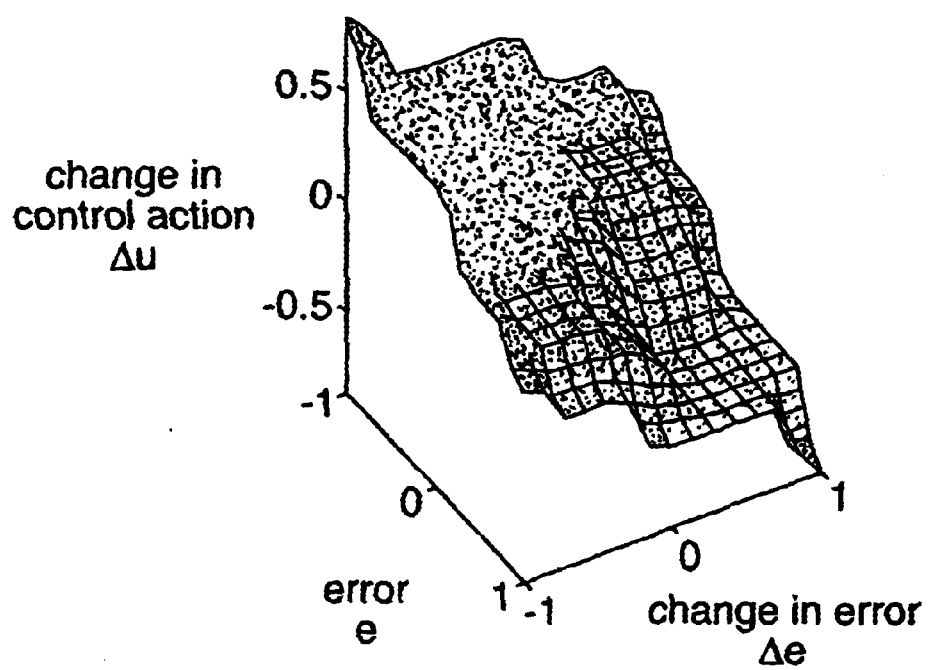
FIG. 9 shows an example of a rule set for one of the FPI controllers.
FIG. 10 shows an example of a control surface for controlling a set point.

An example of a rule set for the FPI controller 58 is shown in FIG. 9. As mentioned above, the rule set maps linguistic descriptions of the error e and the change in error Δe into the control action Δu. In FIG. 9, if e is NM and Δe is PS, then Δu will be PS. Another example is if e is PS and Δe is NS, then Δu will be ZE. Those skilled in the art will realize that there are other rule sets that can be implemented with this invention. FIG. 10 shows an example of a control surface for one of the set points. In particular, FIG. 10 shows a control surface for the control of LSF.

Figure 11:
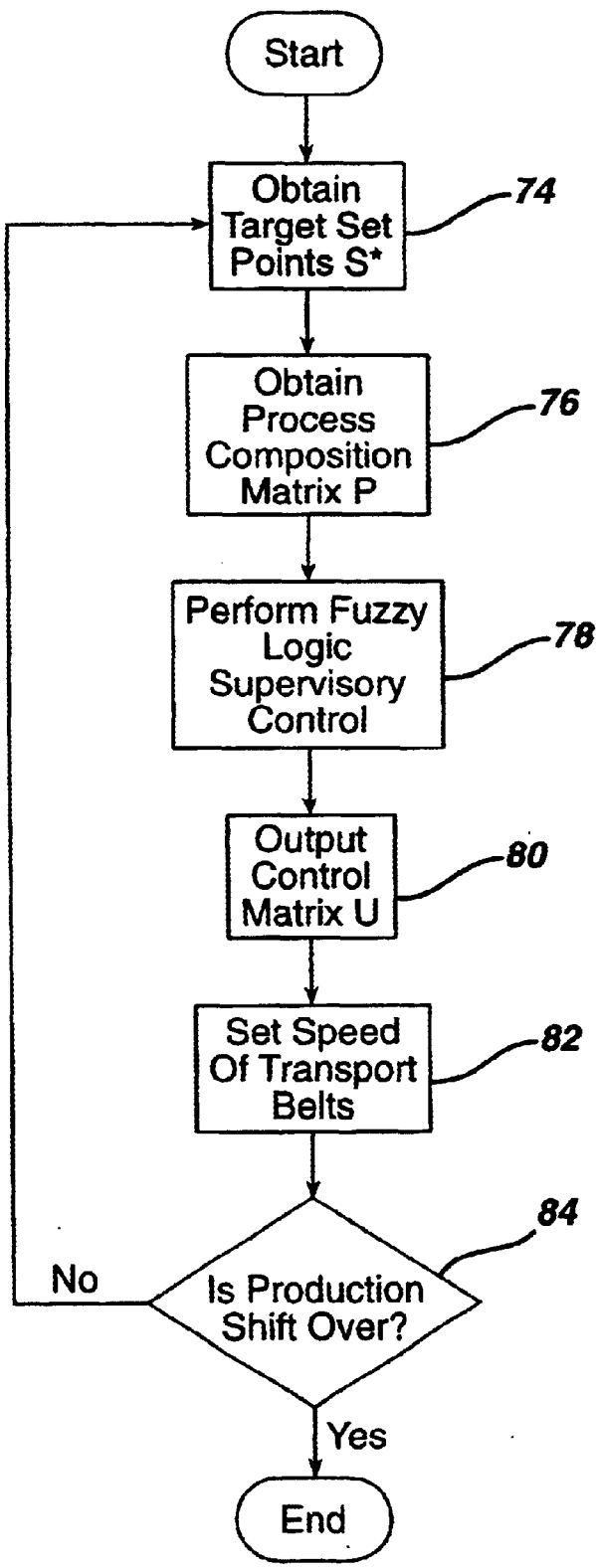
FIG. 11 shows a flow chart setting forth the steps of using fuzzy logic supervisory control to provide raw mix proportioning control.

FIG. 11 shows a flow chart describing the raw mix proportioning control provided by the fuzzy logic supervisory control. Initially, the raw mix proportioning controller obtains a plurality of target set points S* at 74. Next, the raw mix proportioning controller obtains the process composition matrix P at 76. The raw mix proportioning controller then performs the fuzzy logic supervisory control in the aforementioned manner at 78. The raw mix proportioning controller then outputs the control matrix U at 80 which is the proportion of raw materials. The raw mix proportioning controller then sets the speed of each of the transport belts to provide the proper proportion of raw material at 82 which is in accordance with the control matrix U. These steps continue until the end of the production shift. If there is still more time left in the production shift as determined at 84, then steps 74–82 are repeated, otherwise, the process ends.

Figure 12:
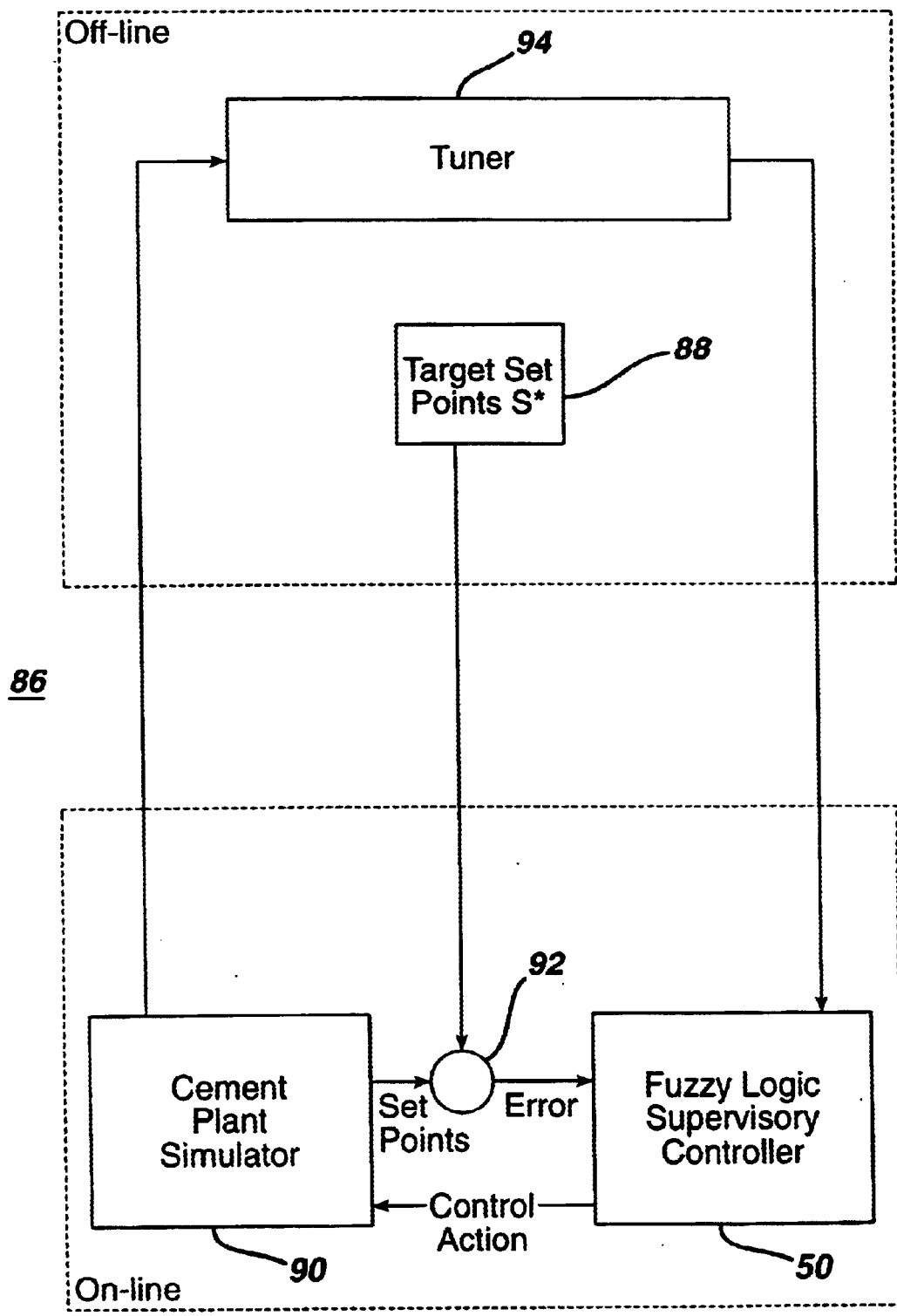
FIG. 12 shows a block diagram of a system for tuning the raw mix proportioning controller shown in FIG. 2.

In another embodiment of this invention, there is a system for tuning the raw mix proportioning controller 36. FIG. 12 shows a block diagram of a system 86 for tuning the raw mix proportioning controller 36. The tuning system 86 can operate in a general-purpose computer system like the one shown in FIG. 1. The tuning system 86 includes a plurality of target set points 88 for operating the cement plant 28. In this embodiment, the target set points comprise LSF, ALM and SIM, however, as mentioned earlier, those skilled in the art will recognize that other set points are within the scope of this invention. A cement plant simulator 90 simulates the operation of the cement plant 28 according to a plurality of set points.

A comparator 92 compares the plurality of set points of the cement plant simulator 90 to the plurality of target set points 88. The comparator 92 sends an error signal corresponding to the tracking error between the set points of the cement plant simulator 90 and the target set points. The fuzzy logic supervisory controller 50 uses the tracking error and change in tracking error to generate a control action to the cement plant simulator 90 that minimizes the tracking error. In this invention, the control modifies proportions of raw material used by the cement plant simulator 90. A tuner 94, coupled off-line to the cement plant simulator 90 and the fuzzy logic supervisory controller 50, optimizes the controller's ability to track between the cement plant simulator 90 and the target set points, as well as provides a smooth control action. The tuner 94 optimizes the tracking and provides a smooth control action by determining an optimal set of parameters for the fuzzy logic supervisory controller. This allows the controller to guard against experiencing disturbances caused by initialization and material fluctuation.

In this embodiment, the cement plant simulator 90 simulates the operation of the cement plant 28 to work in the manner described earlier with reference to FIGS. 2–11. More specifically, the cement plant simulator 90 simulates the operation of using raw material such as limestone, sandstone and sweetener to make cement. In addition, the cement plant simulator simulates the raw mix proportioning control of the raw materials. The cement plant simulator also simulates the mixing of the proportions of the raw material and the grinding and blending performed by the raw mill and the calcination performed by the kiln. The cement plant simulation controls the operation of the cement manufacturing process so that the raw mix meets specified target point values set for LSF, ALM and SIM. The cement plant simulator 90 performs these operations according to equations 1–17.

To tune the fuzzy logic supervisory controller 50, a more detailed explanation of the FPI controllers 58 is provided. The relationship between the output variable u and the input variable e in each FPI controller 58 is expressed approximately as:

$$\frac{\Delta u(t)}{S_u} \approx \frac{\Delta e(t)}{S_d} + \frac{e(t)}{S_e} \tag{18}$$

$$u(t) \approx \frac{S_u}{S_d} \cdot e(t) + \frac{S_u}{S_e} \cdot \int e(t) \tag{19}$$

$$-S_e \leq e(t) \leq S_e \tag{20}$$

$$-S_d \leq \Delta e(t) \leq S_d \tag{21}$$

$$-S_u \leq \Delta u(t) \leq S_u \tag{22}$$

wherein $S_e$, $S_d$, $S_u$, are the scaling factors of the error e, the change of error Δe, and the incremental output variable Δu respectively. The above relationship differs from a conventional proportional integral (PI) controller which is defined as:

$$u(t)=K_p e(t)+K_i \int e(t)dt \tag{23}$$

wherein $K_p$ and $K_i$ are the proportional and integral gain factors, respectively. Comparing the FPI controller of this invention with the conventional PI controller results in the following:

$$K_p \approx \frac{S_u}{S_d} \text{ and } K_i \approx \frac{S_u}{S_e} \cdot \left(\frac{1}{dt}\right) \tag{24}$$

In this embodiment, the performance of the FPI controller 58 is tuned by the tuner 94. In particular, the tuner 94 uses a genetic algorithm to adjust the parameters (i.e., the scaling factors, membership functions, and rule sets) in the knowledge base 70 in a sequential order of significance. A genetic algorithm is the name of a technique that is used to find the best solutions to complex multi-variable problems. In one sense, a genetic algorithm represents a focused and progressive form of trial and error. Essentially, a genetic algorithm is a computer program that solves search or optimization problems by simulating the process of evolution by natural selection. Regardless of the exact nature of the problem being solved, a typical genetic algorithm cycles through a series of steps. First, a population of potential solutions is generated. Solutions are discrete pieces of data which have the general shape (e.g., the same number of variables) as the answer to the problem being solved. These solutions can be easily handled by a digital computer. Often, the initial solutions are scattered at random throughout the search space.

Next, a problem-specific fitness function is applied to each solution in the population, so that the relative acceptability of the various solutions can be assessed. Next, solutions are selected to be used as parents of the next generation of solutions. Typically, as many parents are chosen as there are members in the initial population. The chance that a solution will be chosen to be a parent is related to. the results of the fitness of that solution. Better solutions are more likely to be chosen as parents. Usually, the better solutions are chosen as parents multiple times, so that they will be the parents of multiple new solutions, while the poorer solutions are not chosen at all. The parent solutions are then formed into pairs. The pairs are often formed at random, but in some implementations dissimilar parents are matched to promote diversity in the children.

Each pair of parent solutions is used to produce two new children. Either a mutation operator is applied to each parent separately to yield one child from each parent, or the two parents are combined using a cross-over operator, producing two children which each have some similarity to both parents. Mutation operators are probabilistic operators that try to introduce needed solution features in populations of solutions that lack such a feature. Cross-over operators are deterministic operators that capture the best features of two parents and pass it on to new off-spring solutions. Cross-over operations generation after generation ultimately combines the building blocks of the optimal solution that have been discovered by successful members of the evolving population into one individual.

The members of the new child population are then evaluated by the fitness function. Since the children are modifications of the better solutions from the preceding population, some of the children may have better ratings than any of the parental solutions. The child population is then combined with the original population that the parents came from to produce a new population. One way of doing this, is to accept the best half of the solutions from the union of the child population and the source population. Thus, the total number of solutions stays the same, but the average rating can be expected to improve if superior children were produced. Note that any inferior children that were produced will be lost at this stage, and that superior children will become the parents of the next generation in the next step. This process continues until a satisfactory solution (i.e., a solution with an acceptable rating according to the fitness function) has been generated. Most often, the genetic algorithm ends when either a predetermined number of iterations has been completed, or when the average evaluation of the population has not improved after a large number of iterations.

In this invention, the tuner 94 an art off-the-shelf genetic algorithm such GAlib, which is C++ library of genetic algorithm objects, however, other known algorithms such as GENESIS (GENEtic Search Implementation System) can be used. All that is needed is the fitness function. In this embodiment, the fitness functions are:

$$f_i = \sum_{i=1}^{3} w_i \sqrt{\frac{\sum_{j}^{T}(S_i^* - S_i^j)^2}{T}} \quad (25)$$

$$f_2 = \max_{j=1\ldots T}(w_1 \Delta U_2^j + w_2 \Delta U_3^j) \quad (26)$$

$$f_3 = \frac{1}{T}\sum_{j=1}^{T}\left(\sum_{j=1}^{3} c_i U_i^j\right) \quad (27)$$

$$f_4 = \sum_{k=1}^{3} w_k f_k \quad (28)$$

wherein w is the weighting function; S* is the desired target set point, T is the simulation time; U is the control action; c is the raw material cost; i is the index of three set points; j is the index of time steps; k is the index of the first three fitness functions. The fitness function $f_1$ captures tracking accuracy, the fitness function $f_2$ captures actuator jockeying, the fitness function $f_3$ captures raw material cost and the fitness function $f_4$ combines the weighted sum of fitness functions $f_1$, $f_2$ and $f_3$.

Figure 13:
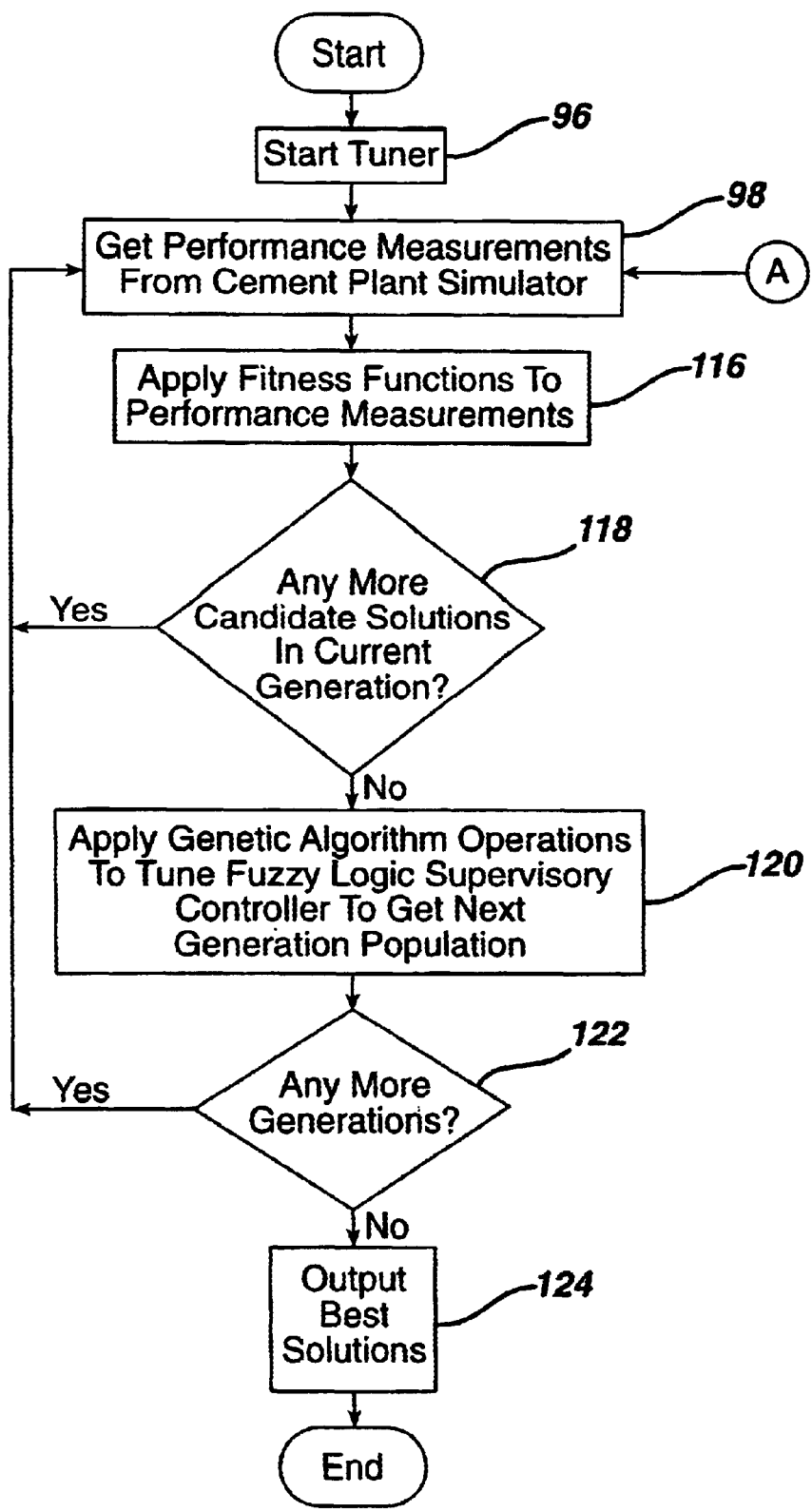
FIG. 13 shows a flow chart setting forth the steps performed to tune the FPI controllers shown in FIGS. 5–6.
Figure 14:
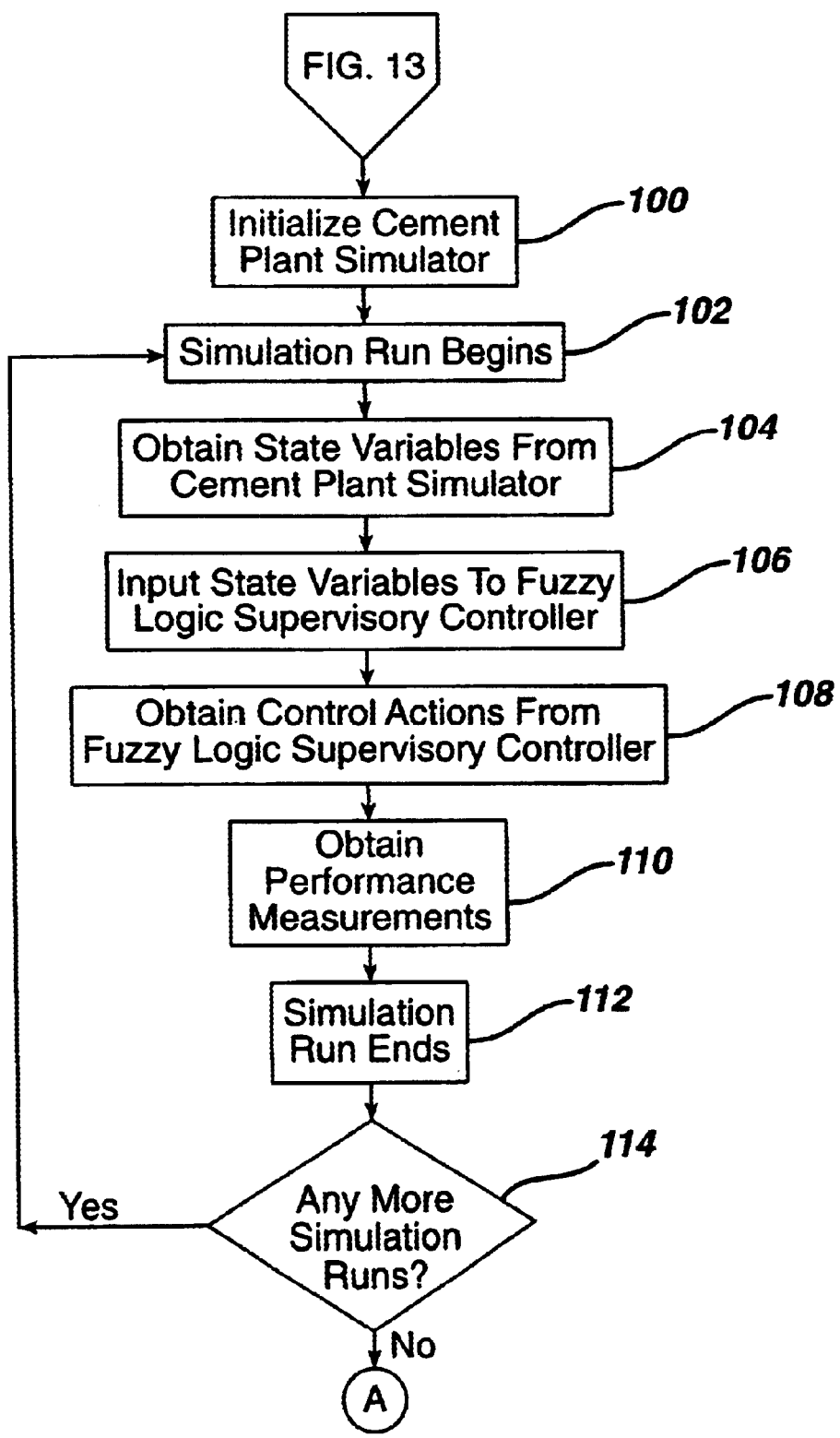
FIG. 14 shows a flow chart setting forth the steps in obtaining performance measurements as shown in FIG. 13.

FIG. 13 shows a flow chart setting forth the steps that are performed to tune the fuzzy logic supervisory controller 50. The tuner is started at 96 and performance measurements are retrieved at 98 from the cement plant simulator. FIG. 14 shows how the performance measurements are obtained. Referring now to FIG. 14, the cement plant simulator 90 is initialized for the cement manufacturing operation at 100. Next, a simulation run is begun at 102. At each simulator run, state variables are obtained from the cement plant simulator at 104. In this embodiment, the state variables are the set points of the cement plant simulator. The state variables are then inputted to the fuzzy logic supervisory controller at 106. The fuzzy logic supervisory controller uses the inputted state variables to recommend a control action at 108. The performance measurements of the cement plant simulator such as the target set points, actual set points and control action are then obtained at 110 and stored in a log. The simulation run then ends at 112. If it is determined that there are more simulation runs left in the operation at 114, then processing steps 102–112 are continued until there are no longer any more simulation runs. Once it is determined that there are no more simulation runs, then the performance measurements are ready to be tuned by the tuner.

Referring back to FIG. 13, after the performance measurements have been obtained from the cement plant simulator, then the tuner applies the fitness functions $f_1$, $f_2$, $f_3$ and $f_4$ to the measurements at 116 for a predetermined number of generations and individuals. The fitness functions $f_1$, $f_2$, $f_3$ and $f_4$ are applied until it has been determined at 118 that there are no more candidate solutions in the current generation left. Next, the genetic algorithm operations are applied at 120 to the fuzzy logic supervisory controller to get the next generation population. The genetic algorithm parameters for this embodiment such as the population size, the cross-over rate, and the mutation rate are set such that the population size is 50, the number of generations to evolve is 25, the cross-over rate is 0.6, and the mutation rate is 0.001.

As mentioned above, the genetic algorithm operations are applied to the fuzzy logic supervisory controller in a sequential order of significance. In this embodiment, the scaling factors are tuned first since they have global effects on the rule sets in the knowledge base. In order to tune the scaling factors, each chromosome of a solution is represented as a concatenation of three 3-bit values for the three floating point values for the scaling factors $S_e$, $S_d$, and $S_u$. An example of possible ranges for the scaling factors is as follows:

$$S_e \in [1, 9]; \tag{29}$$

$$S_d \in [1, 9]; \text{ and} \tag{30}$$

$$S_u \in [0.1, 5] \tag{31}$$

When tuning the membership functions, a chromosome is formed by concatenating the 21 parameterized membership functions for e, $\Delta$e, and $\Delta$u. Since each membership function is trapezoidal with an overlap degree of 0.5 between adjacent trapezoids, the universe of discourse is partitioned into intervals which alternate between being cores of a membership function and overlap areas. The core of negative medium NM and positive medium PM extend semi-infinitely to the left and right respectively outside of the [−1,1] interval. These intervals are denoted by $b_i$ and there are 11 intervals for the seven membership function labels. In general, the number of intervals is defined as:

$$\#(b) = 2 \times \#(MF) - 3 \tag{32}$$

wherein #(b) is the number of intervals and #(MF) is the number of membership functions. Each chromosome is thus a vector of 11 floating point values and therefore the universe of discourse is normalized as follows:

$$\sum_{i=1}^{11} b_i \leq 2 \tag{33}$$

In addition, each interval $b_i$ is set within the range of [0.09, 0.18] and five bits are used to represent a chromosome for the genetic algorithm tuned membership. functions. However, if $\Sigma_i b_i$ exceeds two, then the number of effective membership functions providing partial structure will still be optimized.

The genetic algorithm operations are applied until it has been determined at 122 that there are no more generations. If there are more genetic algorithm generations, then additional performance measurements are obtained from the cement plant simulator 14 in the same manner described for FIG. 14. Once the additional performance measurements are obtained, then steps 116–122 in FIG. 13 are repeated until there are no more generations. Once the genetic algorithms have been applied to all of the generations, then the tuner outputs the best solutions to the fuzzy logic supervisory controller at 124. After the best solutions have been provided to the fuzzy logic supervisor controller 50, then the controller can be implemented into the raw mix proportioning controller 36 and used in the cement plant 28 to ensure that the correct mix and proportions of raw material are used.

The foregoing flow charts of this disclosure show the architecture, functionality, and operation of a possible implementation of the system for tuning a raw mix proportioning controller. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

The above-described system and method for tuning a raw mix proportioning controller comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be, for example but not limited to, an electronic, magnetic, optical, electromagnetic, infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is therefore apparent that there has been provided in accordance with the present invention, a system and method for tuning a raw mix proportioning controller that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

What is claimed is:

1. A system for tuning a raw mix proportioning controller, comprising:
    a plurality of target set points;
    a cement plant simulator for simulating the operation of a cement plant according to a plurality of set points;
    a fuzzy logic supervisory controller for controlling the operation of the cement plant simulator in accordance with the plurality of target set points, wherein the fuzzy logic supervisory controller tracks error and change in tracking error between the plurality of set points of the cement plant simulator and the plurality of target set points and provides a control action to the cement plant simulator that minimizes the tracking error; and
    a tuner, coupled to the cement plant simulator and the fuzzy logic supervisory controller, for optimizing the tracking between the cement plant simulator and the plurality of target set points.

2. The system according to claim 1, wherein the fuzzy logic supervisory controller comprises a fuzzy logic knowledge base comprising scaling factors, membership functions, and rule sets defined for the tracking error, the change in tracking error, and the control action.

3. The system according to claim 2, wherein the fuzzy logic supervisory controller further comprises an interpreter for relating the tracking error and the change in tracking error to the control action according to the scaling factors, membership functions, and rule sets in the fuzzy logic knowledge base.

4. The system according to claim 3, wherein the control action modifies proportions of raw material used by the cement plant simulator.

5. The system according to claim 2, wherein the tuner comprises a plurality of fitness functions for evaluating the operating performance of the cement plant simulator.

6. The system according to claim 5, wherein the tuner further comprises a genetic algorithm for optimizing at least one of the scaling factors, membership functions, and rule sets in the fuzzy logic supervisory controller knowledge base according to the evaluations determined by the plurality of fitness functions.

7. The system according to claim 6, wherein the tuner further comprises an adjuster for adjusting the scaling factors, membership functions, and rule sets in the fuzzy logic supervisory controller knowledge base according to the optimization provided by the genetic algorithm.

8. The system according to claim 1, wherein the fuzzy logic supervisory controller comprises a plurality of low level controllers, wherein each low level controller receives a change in a target set point as an input and generates a change in a control action as an output.

9. The system according to claim 8, wherein the fuzzy logic supervisory controller comprises at least three pairs of low level controllers, wherein each of the at least three pairs of low level controllers receives a change in a target set point as an input and generates a change in a control action as an output.

10. The system according to claim 9, wherein one pair of the at least three pairs of low level controllers receives lime saturation factor as the input, a second pair of the at least three pairs of low level controllers receives alumina modulus as the input, and a third pair of the at least three pairs of low level controllers receives silica modulus as the input.

11. The system according to claim 10, wherein each low level controller in a pair of the at least three pairs of low level controllers generates a change in a control action as an output.

12. The system according to claim 11, further comprising a summer coupled to the at least three pairs of low level controllers for summing all of the change in control actions generated therefrom.

13. The system according to claim 12, wherein the summer comprises at least three summers, wherein a first summer sums a first component of the change in control actions from each of the at least three pairs of low level controllers, a second summer sums a second component of the change in control actions from each of the at least three pairs of low level controllers, and a third summer sums the change in control actions from both the first and second summer.

14. The system according to claim 8, wherein each of the plurality of low level controllers are fuzzy logic proportional integral controllers.

15. The system according to claim 1, wherein the plurality of target set points are physical properties comprising lime saturation factor, alumina modulus and silica modulus.

16. A method for tuning a raw mix proportioning controller, comprising:
obtaining a plurality of target set points;
simulating the operation of a cement plant according to a plurality of set points;
providing a fuzzy logic supervisory controller to control the operation of the cement plant simulation in accordance with the plurality of target set points, wherein the fuzzy logic supervisory controller tracks error and change in tracking error between the plurality of set points of the cement plant simulation and the plurality of target set points and provides a control action to the cement plant simulation that minimizes the tracking error; and
tuning the fuzzy logic supervisory controller to optimize the tracking between the cement plant simulation and the plurality of target set points.

17. The method according to claim 16, wherein the step of providing the fuzzy logic supervisory controller comprises providing a fuzzy logic knowledge base comprising scaling factors, membership functions, and rule sets defined for the tracking error, the change in tracking error, and the control action.

18. The method according to claim 17, wherein the step of providing the fuzzy logic supervisory controller further comprises providing an interpreter for relating the tracking error and the change in tracking error to the control action according to the scaling factors, membership functions, and rule sets in the fuzzy logic supervisory controller knowledge base.

19. The method according to claim 18, further comprising the step of using the control action to modify proportions of raw material used by the cement plant simulation.

20. The method according to claim 17, wherein the step of tuning comprises using a plurality of fitness functions for evaluating the operating performance of the simulated cement plant operation.

21. The method according to claim 20, wherein the step of tuning further comprises using a genetic algorithm for optimizing at least one of the scaling factors, membership functions, and rule sets in the fuzzy logic supervisory controller knowledge base according to the evaluations determined by the plurality of fitness functions.

22. The method according to claim 21, wherein the step of tuning further comprises adjusting the scaling factors, membership functions, and rule sets in the fuzzy logic supervisory controller knowledge base according to the optimization provided by the genetic algorithm.

23. The method according to claim 16, wherein the step of providing the fuzzy logic supervisory controller comprises providing a plurality of low level controllers, wherein each low level controller receives a change in a target set point as an input and generates a change in a control action as an output.

24. The method according to claim 23, wherein the step of providing the fuzzy logic supervisory controller comprises providing at least three pairs of low level controllers, wherein each of the at least three pairs of low level controllers receives a change in a target set point as an input and generates a change in a control action as an output.

25. The method according to claim 24, wherein one pair of the at least three pairs of low level controllers receives lime saturation factor as the input, a second pair of the at least three pairs of low level controllers receives alumina modulus as the input, and a third pair of the at least three pairs of low level controllers receives silica modulus as the input.

26. The method according to claim 25, wherein each low level controller in a pair of the at least three pairs of low level controllers generates a change in a control action as an output.

27. The method according to claim 26, further comprising the step of providing a summer coupled to the at least three pairs of low level controllers for summing all of the change in control actions generated therefrom.

28. The method according to claim 27, wherein the summer comprises at least three summers, wherein a first summer sums a first component of the change in control actions from each of the at least three pairs of low level controllers, a second summer sums a second component of the change in control actions from each of the at least three pairs of low level controllers, and a third summer sums the change in control actions from both the first and second summer.

29. The method according to claim 23, wherein each of the plurality of low level controllers are fuzzy logic proportional integral controllers.

30. The method according to claim 16, wherein the plurality of target set points are physical properties comprising lime saturation factor, alumina modulus and silica modulus.

31. A system for tuning a raw mix proportioning controller, comprising:
means for providing a plurality of target set points;
means for simulating the operation of a cement plant according to a plurality of set points;
means for controlling the operation of the cement plant simulating means in accordance with the plurality of target set points, wherein the controlling means tracks error and change in tracking error between the plurality of set points of the cement plant simulating means and the plurality of target set points and provides a control action to the cement plant simulating means that minimizes the tracking error; and
means for tuning the controlling means to optimize the tracking between the cement plant simulating means and the plurality of target set points.

32. The system according to claim 31, wherein the controlling means comprises a fuzzy logic knowledge base comprising scaling factors, membership functions, and rule sets defined for the tracking error, the change in tracking error, and the control action.

33. The system according to claim 32, wherein the controlling means further comprises an interpreter for relating the tracking error and the change in tracking error to the control action according to the scaling factors, membership functions, and rule sets in the fuzzy logic knowledge base.

34. The system according to claim 33, wherein the control action modifies proportions of raw material used by the cement plant simulating means.

35. The system according to claim 32, wherein the tuning means comprises a plurality of fitness functions for evaluating the operating performance of the cement plant simulating means.

36. The system according to claim 35, wherein the tuning means further comprises a genetic algorithm for optimizing at least one of the scaling factors, membership functions, and rule sets in the fuzzy logic supervisory controller knowledge base according to the evaluations determined by the plurality of fitness functions.

37. The system according to claim 36, wherein the tuning means further comprises means for adjusting the scaling factors, membership functions, and rule sets in the fuzzy logic supervisory controller knowledge base according to the optimization provided by the genetic algorithm.

38. The system according to claim 31, wherein the controlling means comprises a plurality of low level controllers, wherein each low level controller receives a change in a target set point as an input and generates a change in a control action as an output.

39. The system according to claim 38, wherein the controlling means comprises at least three pairs of low level controllers, wherein each of the at least three pairs of low level controllers receives a change in a target set point as an input and generates a change in a control action as an output.

40. The system according to claim 39, wherein one pair of the at least three pairs of low level controllers receives lime saturation factor as the input, a second pair of the at least three pairs of low level controllers receives alumina modulus as the input, and a third pair of the at least three pairs of low level controllers receives silica modulus as the input.

41. The system according to claim 40, wherein each low level controller in a pair of the at least three pairs of low level controllers generates a change in a control action as an output.

42. The system according to claim 41, further comprising means for summing all of the change in control actions generated therefrom.

43. The system according to claim 42, wherein the summing means comprises at least three summers, wherein a first summer sums a first component of the change in control actions from each of the at least three pairs of low level controllers, a second summer sums a second component of the change in control actions from each of the at least three pairs of low level controllers, and a third summer sums the change in control actions from both the first and second summer.

44. The system according to claim 38, wherein each of the plurality of low level controllers are fuzzy logic proportional integral controllers.

45. The system according to claim 31, wherein the plurality of target set points are physical properties comprising lime saturation factor, alumina modulus and silica modulus.

46. A computer-readable medium storing computer instructions for instructing a computer system to tune a raw mix proportioning controller, the computer instructions comprising:
obtaining a plurality of target set points;
simulating the operation of a cement plant according to a plurality of set points;
providing a fuzzy logic supervisory controller to control the operation of the cement plant simulation in accordance with the plurality of target set points, wherein the fuzzy logic supervisory controller tracks error and change in tracking error between the plurality of set points of the cement plant simulation and the plurality of target set points and provides a control action to the cement plant simulation that minimizes the tracking error; and
tuning the fuzzy logic supervisory controller to optimize the tracking between the cement plant simulation and the plurality of target set points.

47. The computer-readable medium according to claim 46, wherein the instructions of providing the fuzzy logic supervisory controller comprises providing a fuzzy logic knowledge base comprising scaling factors, membership functions, and rule sets defined for the tracking error, the change in tracking error, and the control action.

48. The computer-readable medium according to claim 47, wherein the instructions of providing the fuzzy logic supervisory controller further comprises providing an interpreter for relating the tracking error and the change in tracking error to the control action according to the scaling factors, membership functions, and rule sets in the fuzzy logic supervisory controller knowledge base.

49. The computer-readable medium according to claim 48, further comprising instructions of using the control action to modify proportions of raw material used by the cement plant simulation.

50. The computer-readable medium according to claim 47, wherein the instructions of tuning comprises using a plurality of fitness functions for evaluating the operating performance of the simulated cement plant operation.

51. The computer-readable medium according to claim 50, wherein the instructions of tuning further comprises using a genetic algorithm for optimizing at least one of the scaling factors, membership functions, and rule sets in the fuzzy logic knowledge base according to the evaluations determined by the plurality of fitness functions.

52. The computer-readable medium according to claim 51, wherein the instructions of tuning further comprises adjusting the scaling factors, membership functions, and rule sets in the fuzzy logic knowledge base according to the optimization provided by the genetic algorithm.

53. The computer-readable medium according to claim 46, wherein the instructions of providing the fuzzy logic supervisory controller comprises providing a plurality of low level controllers, wherein each low level controller receives a change in a target set point as an input and generates a change in a control action as an output.

54. The computer-readable medium according to claim 53, wherein the instructions of providing the fuzzy logic supervisory controller comprises providing at least three pairs of low level controllers, wherein each of the at least three pairs of low level controllers receives a change in a target set point as an input and generates a change in a control action as an output.

55. The computer-readable medium according to claim 54, wherein one pair of the at least three pairs of low level controllers receives lime saturation factor as the input, a second pair of the at least three pairs of low level controllers receives alumina modulus as the input, and a third pair of the at least three pairs of low level controllers receives silica modulus as the input.

56. The computer-readable medium according to claim 55, wherein each low level controller in a pair of the at least three pairs of low level controllers generates a change in a control action as an output.

57. The computer-readable medium according to claim 56, further comprising instructions of providing a summer coupled to the at least three pairs of low level controllers for summing all of the change in control actions generated therefrom.

58. The computer-readable medium according to claim 57, wherein the summer comprises at least three summers, wherein a first summer sums a first component of the change in control actions from each of the at least three pairs of low level controllers, a second summer sums a second component of the change in control actions from each of the at least three pairs of low level controllers, and a third summer sums the change in control actions from both the first and second summer.

59. The computer-readable medium according to claim 53, wherein each of the plurality of low level controllers are fuzzy logic proportional integral controllers.

60. The computer-readable medium according to claim 46, wherein the plurality of target set points are physical properties comprising lime saturation factor, alumina modulus and silica modulus.

* * * * *